United States Patent
Qin et al.

(10) Patent No.: US 6,393,480 B1
(45) Date of Patent: May 21, 2002

(54) APPLICATION RESPONSE TIME PREDICTION

(75) Inventors: Zhigang Qin, San Jose, CA (US); Steven J. Schaffer, Lone Tree, CO (US); Peter John Sevcik, Andover, MA (US)

(73) Assignee: Compuware Corporation, Farmington Hills, MI (US)

( * ) Notice: Subject to any disclaimer, the term of this patent is extended or adjusted under 35 U.S.C. 154(b) by 0 days.

(21) Appl. No.: 09/337,175

(22) Filed: Jun. 21, 1999

(51) Int. Cl.[7] .................................. G06F 11/30
(52) U.S. Cl. ..................... 709/224; 703/22; 703/19
(58) Field of Search .................. 709/223, 224, 709/220; 703/19, 22, 23, 13

(56) References Cited

U.S. PATENT DOCUMENTS 5,754,831 A * 5/1998 Berman ..................... 703/13
5,978,576 A * 11/1999 Sanadidi et al. ............. 703/22
6,061,722 A * 5/2000 Lipa et al. .................. 709/224

* cited by examiner

Primary Examiner—Kenneth R. Coulter
(74) Attorney, Agent, or Firm—Blakely, Sokoloff, Taylor & Zafman, LLP

(57) ABSTRACT

A computer-implemented method, system, and program product for application response time prediction provides an estimate of application performance in a second network given performance characteristics of the application in a first network. The invention avoids unnecessary simulation of an entire network, and is able to take into account the effect of network performance characteristics on both simple and non-simple applications, including those having relationships among threads.

54 Claims, 8 Drawing Sheets

APPLICATION RESPONSE TIME PREDICTION

CROSS-REFERENCE TO RELATED APPLICATION

The present invention is related to U.S. patent application Ser. No. 09/244,274, entitled "Visual Thread Diagram," filed on Feb. 3, 1999, the disclosure of which is hereby incorporated by reference.

BACKGROUND OF THE INVENTION

1. Field of the Invention

The present invention relates generally to network-based software applications, and more particularly to a computer-implemented system, method, and computer program product of predicting the response time of a network-based software application.

2. Description of Background Art

A network-based multi-tiered or distributed application that works well across a Local Area Network (LAN) may fail to perform well across a Wide Area Network (WAN). The difference in performance of the application may be due to a number of factors, including network characteristics such as bandwidth, connection parameters, latency, and the like. Accordingly, it is desirable to be able to predict the performance, and particularly the response time, of a network-based application on a particular network, before the application is actually deployed on the network. Such prediction, if reliable, can save substantial costs in developing an application, since network characteristics can be taken into account and the application modified as needed so as to be able to run satisfactorily in the particular network environment.

Traditionally, response time prediction is accomplished in one of two ways. One technique is to perform discrete-event analysis using a simulation of the entire network, as performed, for example, in the "Optimal Performance" product from Optimal Networks. Such a technique is often cumbersome, as it generally requires a large number of configurations to be specified in order to build a simulation model of an entire network. In addition, simulation time using discrete-event analysis is often lengthy, particularly if the simulation being implemented is relatively complex.

Another known technique for application response time prediction is to perform a theoretical analysis of network characteristics using, for example, queuing theory. Although well-known in the art, such an approach is often impractical and has been found to be unreliable for many large or medium-sized networks. In many cases, such an approach may also fail to take into account the effects of parallel operations and interrelationships among operations, thus yielding inaccurate results.

What is needed is a system, method, and computer program product of application response time prediction that avoids the limitations of prior art techniques. What is further needed is a system, method, and computer program product for generating application response time predictions in a reliable manner without requiring excessive time or resources for configuration of system-wide simulation models, and without resorting to impractical theoretical approaches. What is further needed is a system, method, and computer program product that takes into account parallel operations and thread interrelationships in generating such predictions.

SUMMARY OF THE INVENTION

In accordance with the present invention, there is provided a system and method of application response time prediction that provides accurate predictions without requiring system-wide simulation, and without requiring excessive configuration efforts. The present invention is thus able to estimate performance of an application in a particular network environment, such as for example a WAN.

To predict the performance of a network-based application, the present invention breaks the application down into threads. By predicting the response time of each thread, and taking into account relationships among threads as well as the potential effect of parallel threads, the present invention is able to predict response time for the application as a whole.

The present invention determines predicted response time by performing an analysis of the application's performance on a LAN, and combining this information with particular characteristics of the WAN on which the application will be deployed. In one embodiment, the present invention takes into account such factors as:

bottleneck bandwidth of the WAN (maximum available WAN link bandwidth);
  network configuration, such as for example TCP window size, and the like;
  round-trip latency (amount of time required for data to travel from client to server and back, e.g. bit-level latency); and
  background load on the bottleneck WAN link (traffic on the link that is not generated by the application).

Performance characteristics of the application on the LAN can include, for example, processing time (client as well as server), while network characteristics of the WAN can include, for example, transmission delays and/or propagation delays. The invention develops a predicted response time by adding the measured processing time to the predicted or measured transmission and/or propagation delay of the WAN. In addition, thread relationships and the effect of parallel threads can be taken into account.

The present invention is able to measure bandwidth for the WAN implementation of the application by determining an equivalent bandwidth based on the bandwidth of the WAN link and the average queue length on the network. Average queue length can be determined based on the utilization factor of the network.

By combining information describing the characteristics of the WAN with known performance characteristics of the application as it operates on a LAN, the present invention generates an accurate prediction of application response time for a WAN-based implementation of the application. The invention is able to generate such predictions for applications having parallel threads as well as for those not having any parallel threads.

The present invention can also take into account WAN characteristics such as slow start flow control which may result in additional turns when the application is deployed, or sliding window flow control which yields a reduced equivalent bandwidth.

In predicting application response time, the present invention also takes into account thread relationships, including for example parent-child relationships and finish-start relationships among threads. When thread overlap may change in the WAN implementation, the present invention takes this into account as well.

DETAILED DESCRIPTION OF THE PREFERRED EMBODIMENTS

The following definitions are used in the description of the preferred embodiments, but should not be considered to limit the claims of the present invention. Other definitions may be employed in connection with the present invention.

Frame: A frame is a block of data, structured by some protocol and transmitted on a network.

Thread: A thread is a sequence of transmitted frames that constitutes a single "action" in the context of the protocol being used. For example, the retrieval of a file (such as a JPEG image) from a World Wide Web server is a thread. In one embodiment, the frames of a thread are always sequential, so that there is no more than one request frame outstanding at any time for a particular thread.

Turn: A turn is a complete request/response or sequence of frames on a single thread between two nodes. A thread may contain a single turn or more than one turn.

Child Thread: If in an application, there are two threads $T_1$ and $T_2$, which satisfy the following conditions:

1) $T_1$ starts later than $T_2$; and
2) $T_1$ finishes earlier than $T_2$; and
3) At least one node is shared by $T_1$ and $T_2$; and
4) The client nodes of $T_1$ and $T_2$ are different; and
5) $T_2$ has the latest start time of all threads satisfying $T_2$'s conditions 1–4 with respect to $T_1$;

then $T_1$ is a child thread of $T_2$. In protocols other than the Hypertext Transfer Protocol (HTTP), condition 4 may be omitted. Other definitions of child thread may be employed in connection with the present invention.

Parent Thread: If $T_1$ is a child thread of $T_2$, then $T_2$ is a parent thread of $T_1$.

Thread Family: A parent thread and its child thread(s) are collectively known as a thread family.

Finish-Start Relationship: If in an application, the start of a thread $T_2$ depends upon the completion of another thread $T_1$, then $T_1$ and $T_2$ have a finish-start relationship. Completion of a thread for purposes of this definition need not include acknowledge frames or other frames having zero payload.

Parallel Threads: If at any moment, there is more than one thread running for an application, the threads are called parallel threads of the application.

Simple Application: An application having no parallel threads is a simple application.

Non-Simple Application: An application having at least one parallel thread is a non-simple application.

The present invention is described herein in terms of a system, method, and software product for predicting application response time in a computer network, though one skilled in the art will recognize that the present invention may be used with other applications and environments.

Figure 7:
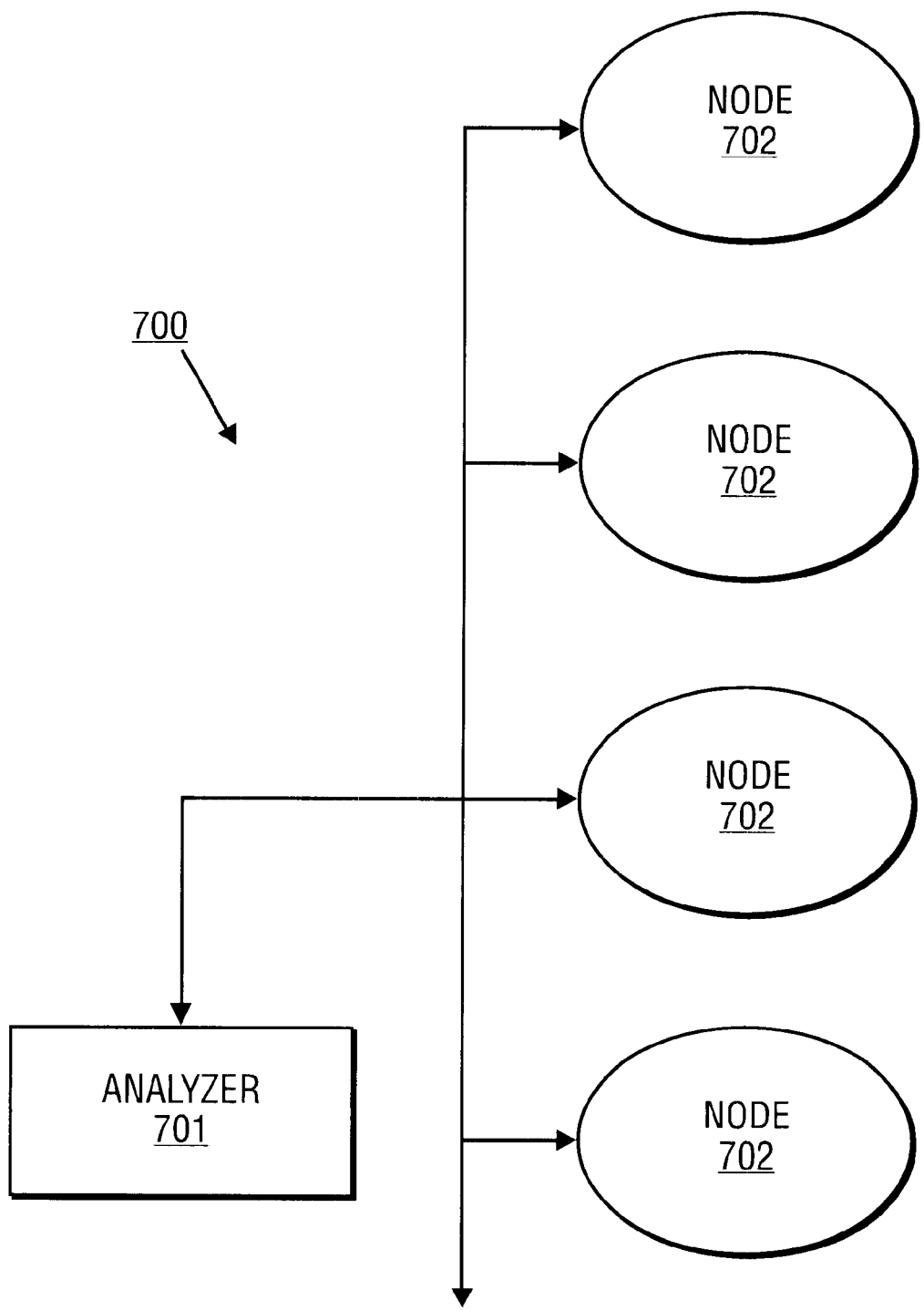
FIG. 7 is a block diagram of a computer network.

Referring now to FIG. 7, there is shown a network 700 containing a number of interconnected nodes 702, which may be servers, clients, routers, and other networked components. The topology shown in FIG. 7 is merely exemplary; network connections may be arranged according to any other scheme, depending on the configuration and requirements of the particular network. Connections among nodes 702 are established by well-known protocols such as Transfer Control Protocol/Internet Protocol (TCP/IP) along conventional physical connection media such as an Ethernet, T1, or T3 line. In one embodiment, the present invention is implemented using a software product running on an analyzer 701. Analyzer is, for example, a computer connected to network 701, capable of running the software for prediction of application response time as described herein. Such computer is for example, a conventional personal computer with a Pentium II microprocessor, random access memory (RAM), input and output devices, and storage. It runs an operating system, such as Windows 98 from Microsoft Corporation.

Figure 6:
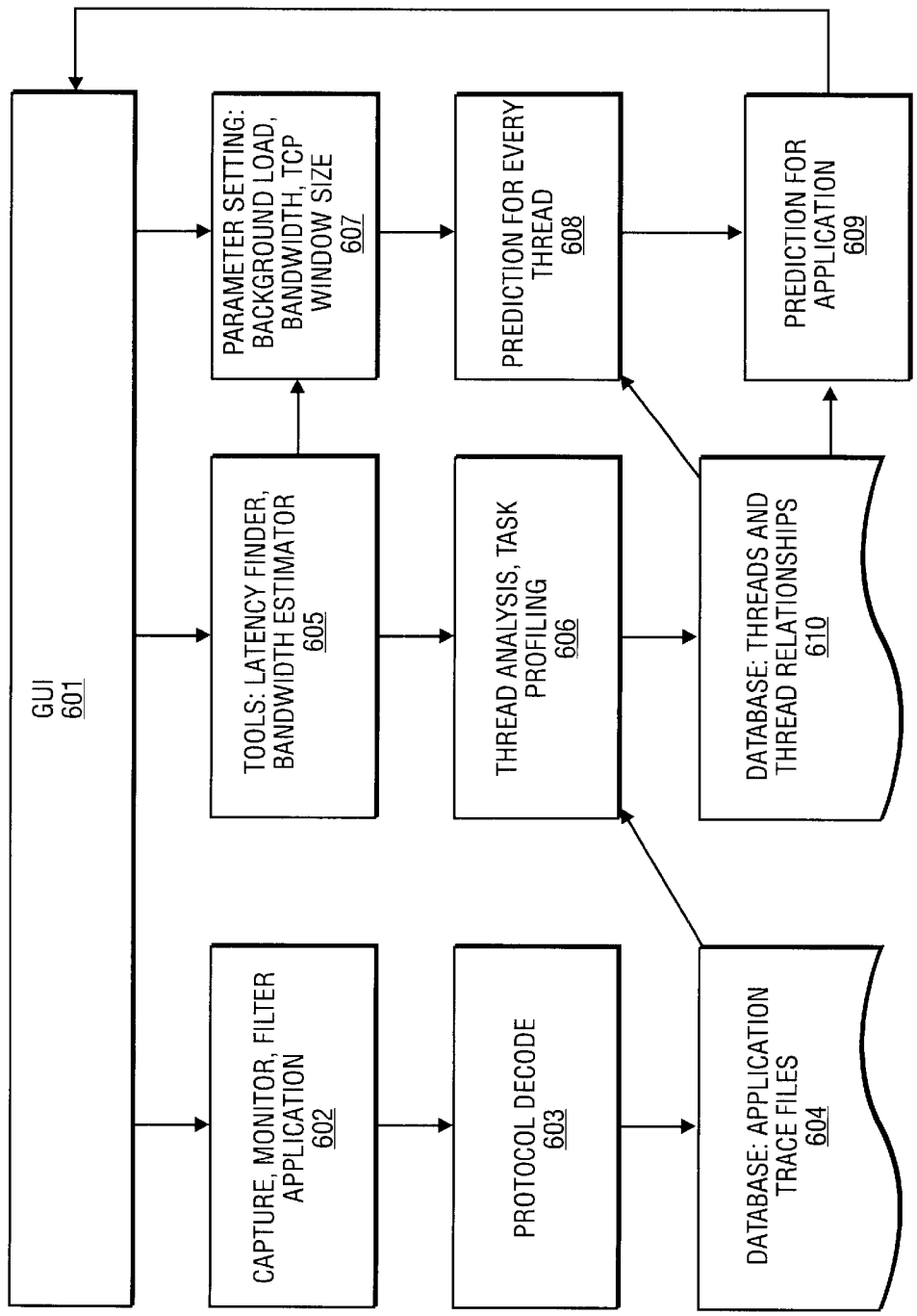
FIG. 6 is a block diagram of the software architecture of one embodiment of the invention.

Referring now to FIG. 6, there is shown a block diagram of a software architecture for practicing the present invention according to one embodiment. The particular elements shown in FIG. 6 are not required for practicing the invention, except as specifically recited in the claims. In one embodiment, the various functional components of FIG. 6 are implemented as a software product running on a computer connected to network 701.

Graphical user interface (GUI) 601 accepts input from the user and provides output via a display screen, as described for example in the related application for "Visual Thread Diagram," or in a conventional manner as is known in the art. Capture, Monitor, Filter Application module 602 measures application characteristics (such as processing time at nodes), as described below. Protocol decode module 603 identifies the protocol of a product by identification of packet header bytes. Database 604 provides storage of application trace files in a conventional manner, for use with the present invention. Tools module 605 contains software tools for determining latency and bandwidth as is known in the art. Thread analysis and task profiling module 606 breaks the stream of frames into threads and determines relationships among the threads. Database 610 stores data defining threads and relationships, using conventional data storage techniques. Parameter setting module 607 facilitates specification of certain parameters such as background load, bandwidth, and TCP window size, as described below. Prediction modules 608 and 609 perform the steps of the present invention, and determine predicted application response time as described in detail below. Thread prediction module 608 provides predictions for individual threads, while application prediction module 609 provides predictions for an application as a whole.

Figure 8:
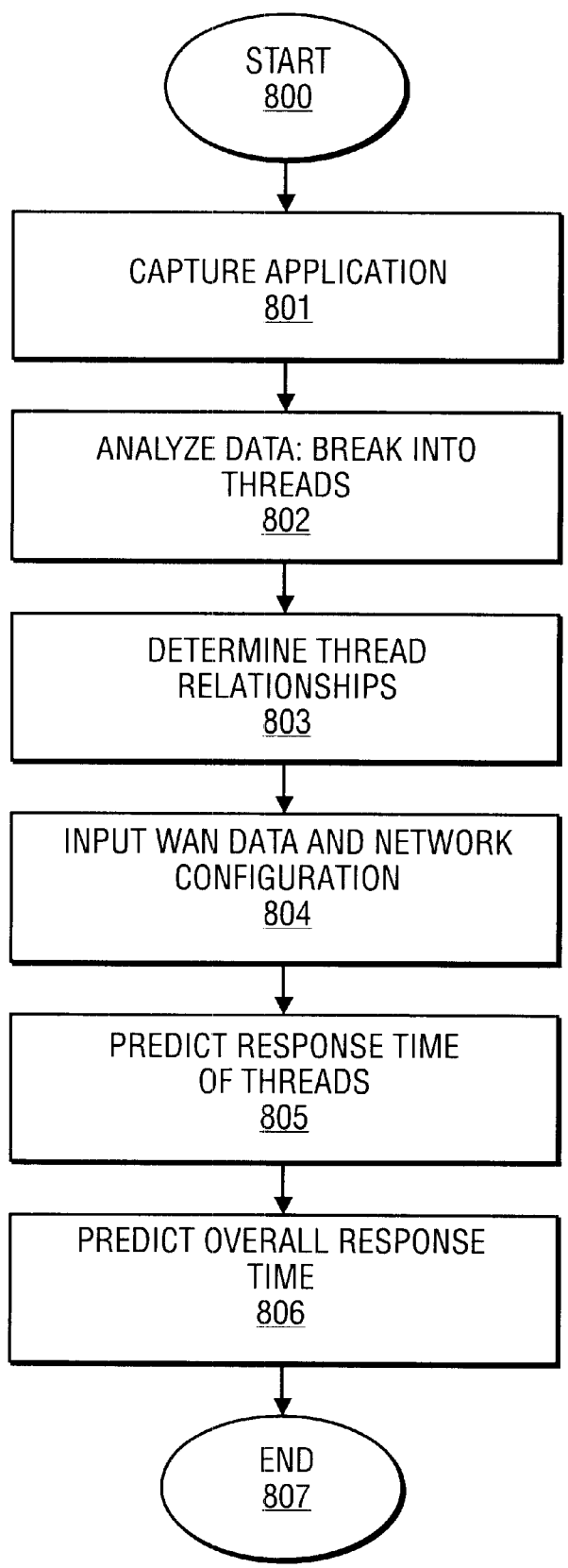
FIG. 8 is a flow diagram showing a method of application response time prediction according to the present invention.

Referring now to FIG. 8, there is shown a flowchart of the operation of one embodiment of the present invention. The invention captures 801 relevant data concerning the application being analyzed, as described above in connection with Capture, Monitor, Filter Application module 602. The captured data is then analyzed 802 and broken down into individual threads. Thread relationships are then determined 803. Steps 802 and 803 may be performed by thread analysis and task profiling module 606. The invention then accepts input 804 describing the network on which the application is to be deployed (e.g. a WAN) and the configuration of the network. Such information includes, for example, bottlenecks, bandwidth, and the like, as described in more detail below. Based on the application data and the network description, the invention predicts 805 the response time of each individual thread of the application, as described in more detail below. In essence, the invention takes into account propagation delay, transmission delay, and client and server processing times, in developing the predicted response time. Based on the predicted response times for threads, the invention then predicts 806 an overall response time for the application, taking into account thread relationships determined in 803.

Each of the steps of FIG. 8 will now be described in greater detail.

Initially, the invention captures 801 the application in order to measure its performance characteristics (such as processing time at nodes) on a LAN. Such measurement is accomplished, in one embodiment, using conventional application performance measuring techniques, such as those used by Sniffer Basic by Network Associates, Inc. (www.nai.com), for evaluating performance with respect to the transfer of individual packets across network connections. In another embodiment, application-level measurement may be performed, as described in related application "Visual Thread Diagram." For example, packet transfer times can be measured and aggregated into a performance metric.

Once the application data has been captured, the data is analyzed 802 and broken down into threads. As described above, a thread is a sequence of transmitted frames that constitutes a single "action" in the context of the protocol being used. Thread-level analysis has been found to be an effective framework for predicting application behavior in the context of the present invention.

The invention also determines 803 thread relationships so that the predicted application performance will accurately reflect the effect of such relationships in the WAN environment. Thread relationships often represent dependencies resulting from bandwidth or other limitations of the network and may thus be affected by the characteristics of the WAN network upon deployment thereon, particularly when the WAN characteristics result in increased thread overlap, as is discussed below.

Figure 1:
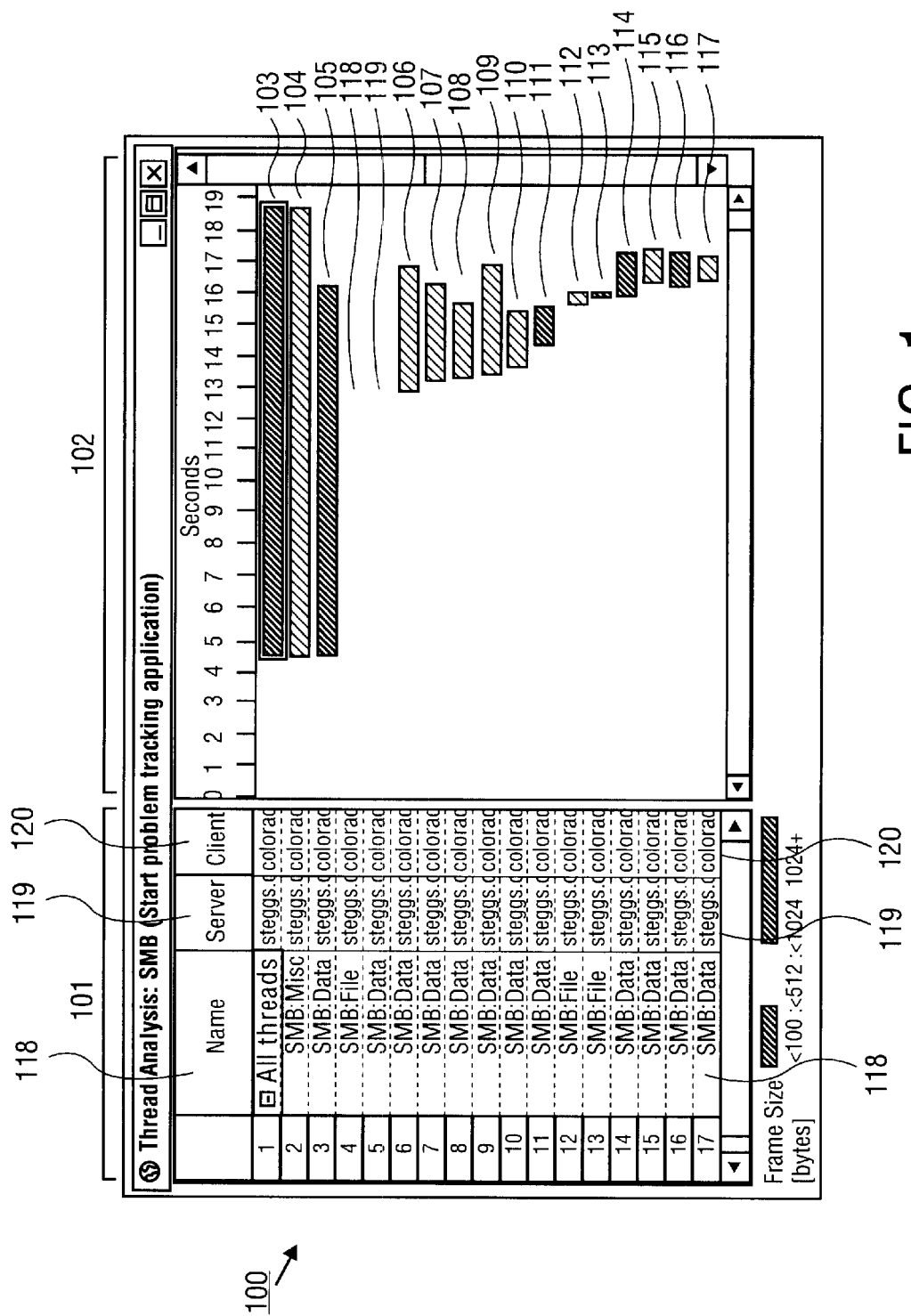
FIG. 1 is a screen shot of a visual thread diagram showing parent-child relationships.
Figure 2:
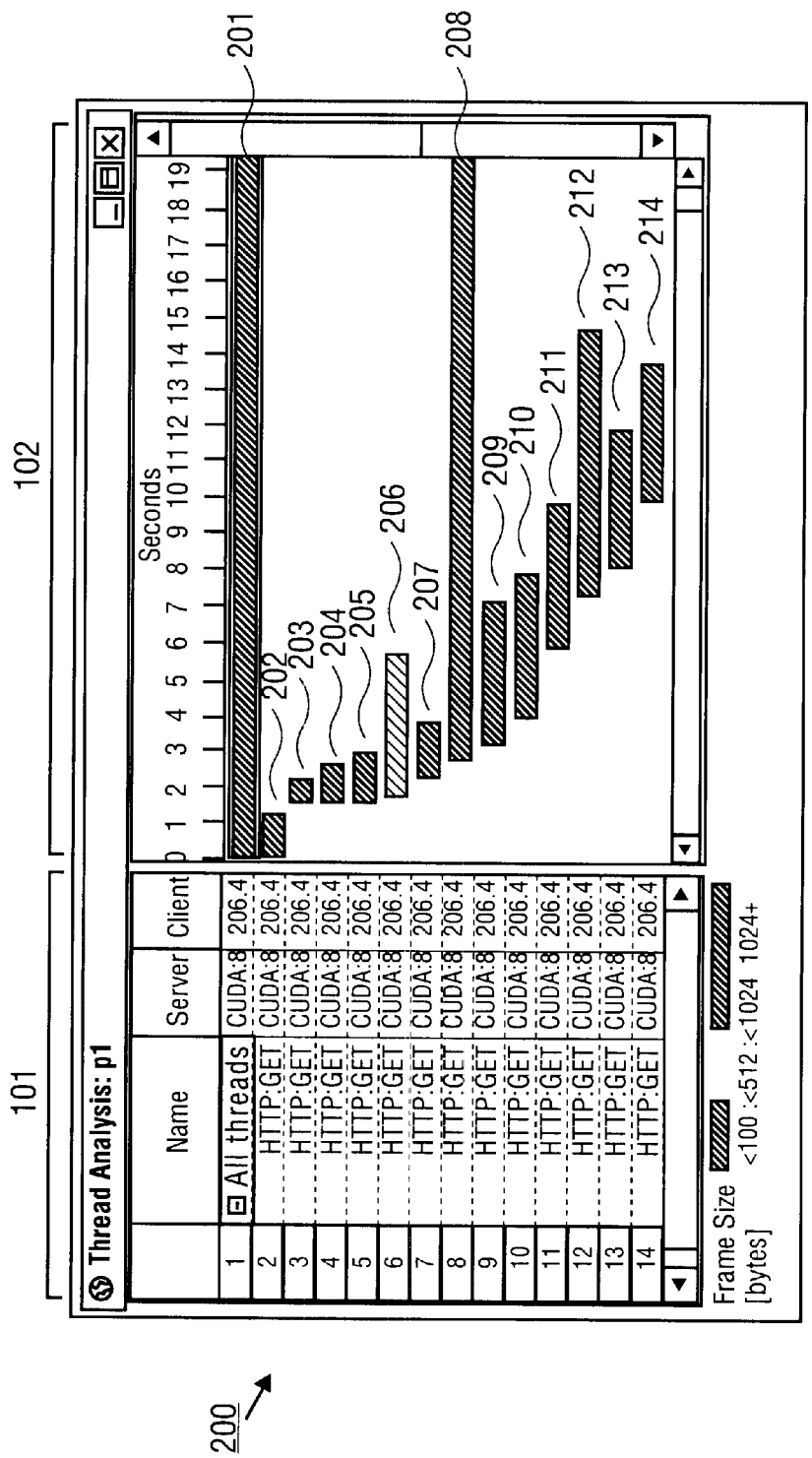
FIG. 2 is a screen shot of a visual thread diagram showing finish-start relationships.

For illustrative purposes, FIGS. 1 and 2 show examples of thread relationships that are determined and recognized by the present invention. Referring now to FIG. 1, there is shown a screen shot 100 of an example of a visual thread diagram, as displayed by GUI 601, showing parent-child relationships. Thread description pane 101 shows descriptive information for each of a number of threads, including the thread name 118, server node 119, client node 120, and the like. Other descriptive information may also be shown, such as average frame size, number of turns, and the like. Pane 102 shows a visual diagram of thread characteristics in a Gantt chart, providing a visual representation of start time and duration of each thread, as described in more detail in related application Ser. No. 09/244,274, entitled "Visual Thread Diagram." Horizontal bars 103 to 117 each represent a thread corresponding to a row of description pane 101. The positioning and length of each horizontal bar 103 to 117 represent the start time and duration, respectively, of the corresponding thread.

FIG. 1 illustrates several examples of parent-child relationships. For example, thread 106 is a parent thread with respect to thread 107 (i.e., thread 107 starts later than and finishes earlier than thread 106, thread 107 shares a node with thread 106 but they have different client nodes, and thread 106 has the latest start time of all threads satisfying the above conditions with respect to thread 107). Similarly, thread 106 is a parent thread with respect to thread 109, thread 107 is a parent thread with respect to thread 108, and thread 109 is a parent thread with respect to thread 110.

Referring now to FIG. 2, there is shown a screen shot 200 of an example of a visual thread diagram, as displayed by GUI 601, showing finish-start relationships. For example, threads 203 and 207 have a finish-start relationship (i.e. the start of thread 207 depends upon the completion of thread 203). Similarly finish-start relationships exist between threads 204 and 208, 205 and 209, and 206 and 211. For illustrative purposes, a vertical line is shown in FIG. 2 denoting each of these finish-start relationships between threads.

The visual thread diagram of FIG. 2 illustrates an example of a non-simple application, since four parallel threads are shown. If the protocol allows a maximum of four parallel threads, then once the maximum is reached, new threads can begin only when another thread finishes. The finish-start relationship is thus established between the thread that is finishing and the new thread that is starting.

For example, at approximately 1.0 seconds, threads 203, 204, 205 and 206 are all active in parallel. Thus, if the protocol only allows four threads, no new threads can begin until one of the active threads finishes. Thread 203 finishes first, thus allowing thread 207 to start. This sequence of events forms the finish-start relationship between threads 203 and 207.

Thread relationships such as parent-child and finish-start are significant in one embodiment of the present invention, because such relationships are generally preserved when the application is moved to a different network environment, though the relationships are sometimes modified due to the new environment. Thus, such relationships are taken into account by the present invention when predicting response time for the application in the new environment. In addition, as will be seen below, changes in thread overlap may result when the application is migrated to the new environment, and may cause increases in processing time depending on thread relationships. Since such relationships are common in network-based applications and web-based communication using the HTTP protocol, the present invention is better able to provide accurate predictions of application performance in such environments by performing analyses of thread relationships.

Figure 5A:
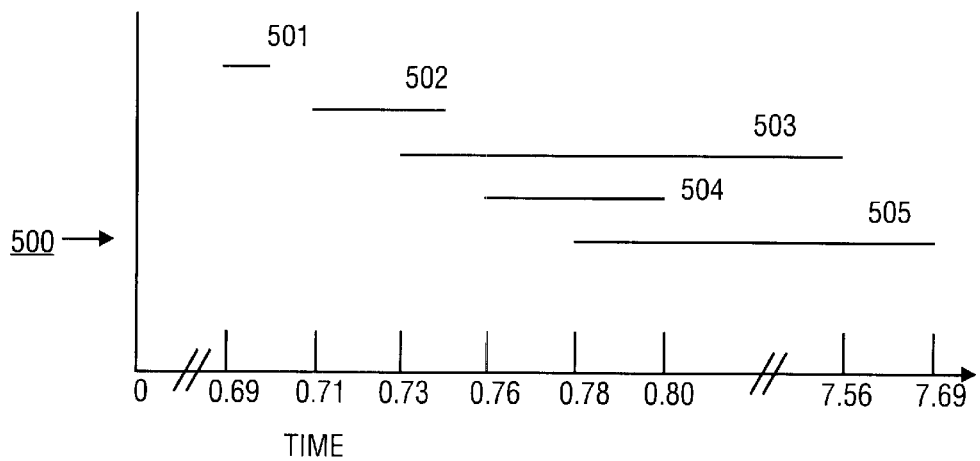
FIG. 5A is a block diagram showing an example of thread relationships.

Referring now to FIG. 5A, there is shown an example of thread relationships shown in Gantt chart 500. Five threads 501–505 are depicted, having start times and durations as follows:

| Thread | Start Time | Duration |
| --- | --- | --- |
| 501 | 0.69 | 0.01 |
| 502 | 0.71 | 0.03 |
| 503 | 0.73 | 6.83 |
| 504 | 0.76 | 0.14 |
| 505 | 0.78 | 6.91 |

Figure 5B:
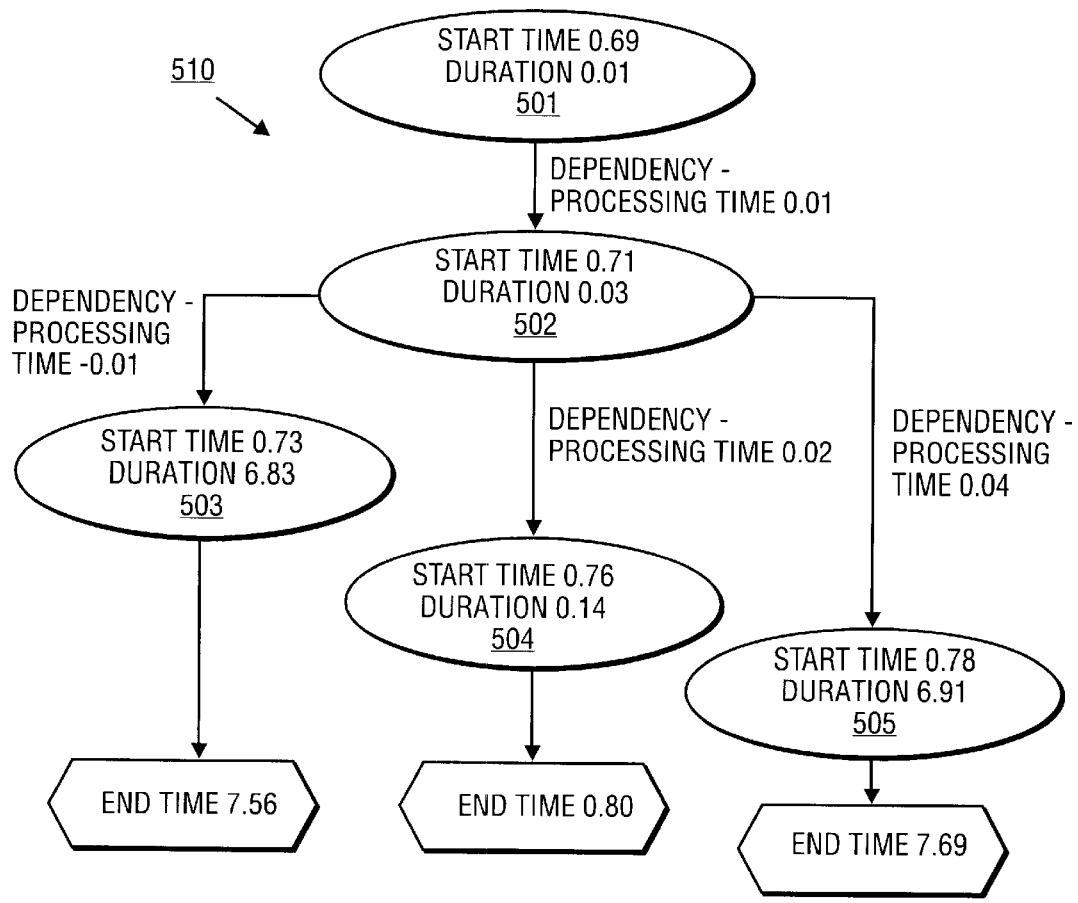
FIG. 5B is a dependency diagram showing a graphical depiction of thread relationships.

Referring also to FIG. 5B, dependency diagram 510 provides a graphical depiction of the relationships among the threads 501–505 of chart 500. For each thread, a start time and a duration are provided. Based on these values, dependencies are established, along with a processing time associated with each dependency. For example, threads 501 and 502 have a finish-start relationship with a processing time of 0.01 between the finish time of thread 501 and the start time of thread 502.

Based on the start times, dependencies, and durations, end times for the parallel threads are also derived, as shown in FIG. 5B.

Modeling of WAN

In step 804, the invention obtains information describing the WAN and the network configuration. The present invention is able to predict the response time of an application without building a representation of the entire WAN. In one embodiment, the present invention develops a model of certain characteristics of the communications path(s) used by the application. In particular, in one embodiment, the bottleneck for the communications path(s) is employed as a modeling parameter, since the characteristics of the bottleneck are a useful indicator of the performance along the path(s).

For example, a bottleneck in a WAN is often the WAN link, which is typically shared among a large number of users. Hence, the present invention is able to generate an accurate prediction of network behavior by modeling the bottleneck as a single queue server, using the available bandwidth of the WAN link to represent the service rate of the queue server. Using this model, the present invention is able to determine the latency for each frame due to the background traffic in the WAN, since the increase in latency is equivalent to the decrease in available bandwidth. Hence, in one embodiment, the present invention uses a measure of the available bandwidth to model the impact of the background traffic on the response time.

Equivalent bandwidth can be represented as:

$$r' = \frac{r}{N+1} \quad \text{(Eq. 1)}$$

where:
 r is the bandwidth of the WAN link; and
 N is the average queue length.

Since the traffic on a WAN link consists of a large number of frames coming from a wide range of sources, one embodiment of the present invention employs a M/M/1 queuing system to model the WAN link. The M/M/1 queuing system uses a single queuing station with a single server, as described by Dimitri Bertsekis et al., Data Networks. In the M/M/1 system, a utilization factor p can be derived by:

$$\rho = \frac{\lambda}{\mu} \quad \text{(Eq. 2)}$$

where:
 $\lambda$ is the rate of arrival of clients according to a Poisson process, and
 $1/\mu$ is mean probability of the service time, and the service time is exponential.

As described by Bertsekis et al., N can then be obtained by:

$$N = \frac{\rho^2}{1-\rho} \quad \text{(Eq. 3)}$$

The utilization factor p can be interpreted as the background traffic load.

Response Time for Threads

In step 805, the invention predicts the response time of the threads of the application. For illustrative purposes, the following description discusses the use of an embodiment of the present invention for predicting response time for threads in a simple application, i.e. an application having no parallel threads.

One application of the present invention is to predict the response time of an application being deployed in a WAN environment, when the corresponding response time in a LAN environment is known (generally by measuring performance metric by well-known techniques). If the application has no parallel threads and does not change its behavior when deployed in the WAN environment, the predicted response time can be determined by adding the transmission delay for each turn.

Figure 3:
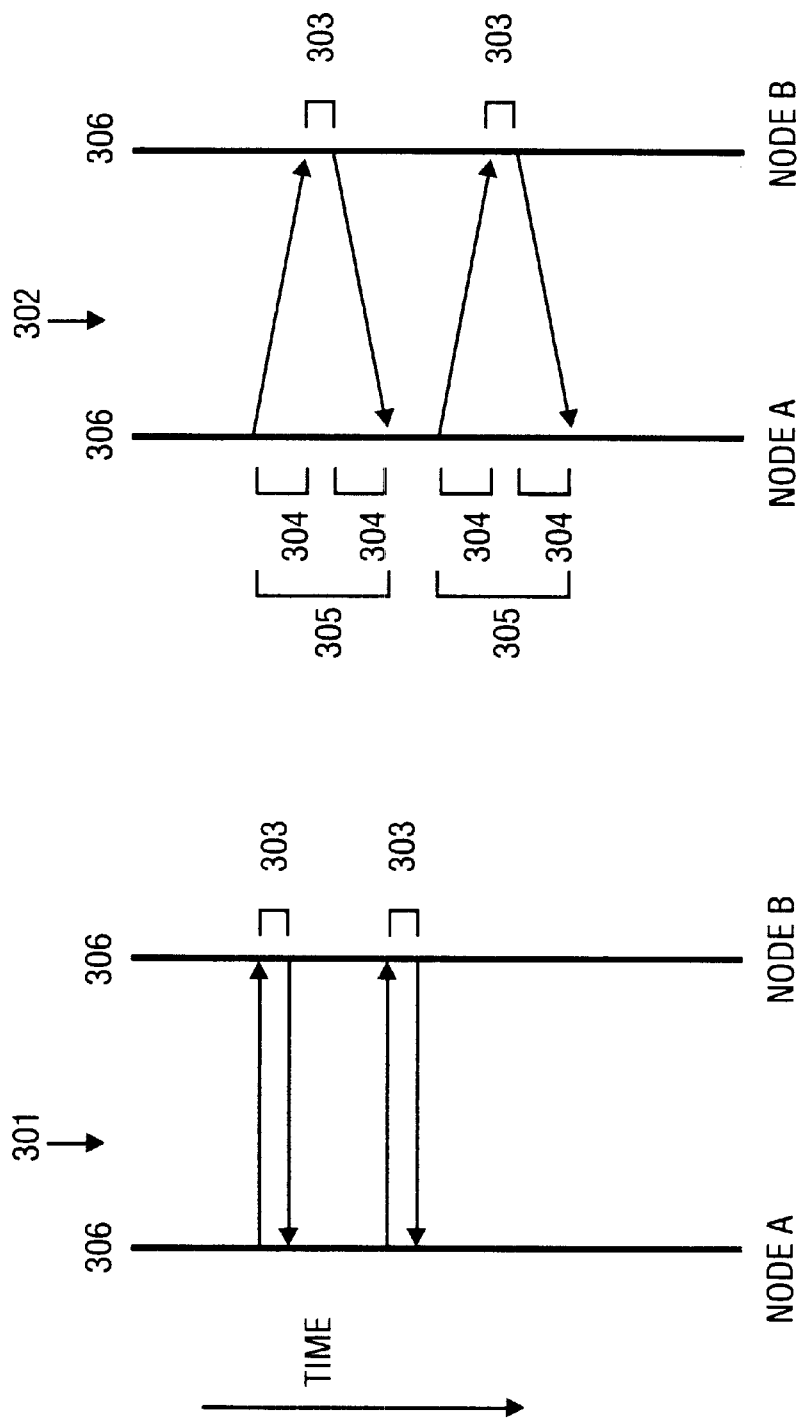
FIG. 3 is a diagram showing response prediction for a simple application.

Referring now to FIG. 3, there is shown an example of event traces illustrating response prediction for a simple application (i.e. no parallel threads). LAN operation 301 is contrasted with WAN operation 302 for a series of turns between two nodes 306, designated as Nodes A and B. Processing time 303 represents the time taken at Node B for processing at each turn, and thus corresponds to the time between reception of a packet at Node B and transmission of a reply packet. Under WAN operation, an additional delay 304 for each turn represents transmission delay between one node 306 and the other, commonly resulting from factors such as background load on the WAN link, and the like, as described above. Thus, total delay 305 can be predicted by adding processing time 303 to transmission delay 304 for each turn.

In one embodiment, processing time delay 303 at both server and client nodes is considered, where applicable. Thus, the total delay is equal to:

$$D_{trx} + D_{prp} + p_c + p_s \quad \text{(Eq. 4)}$$

where:
 $D_{trx}$ is the transmission delay (the amount of time required for the sender to transmit a quantity of data);
 $D_{prp}$ is the propagation delay (the amount of time required for the data to propagate along the transmission medium);
 $p_c$ is the client processing time; and
 $p_s$ is the server processing time.

The response time of the application is given as:

$$t = \Sigma(D_{trx} + D_{prp} + p_c + p_s) \quad \text{(Eq. 5)}$$

where the summation is made for all turns of the application. Using Eqs. 1 and 3, $$\sum D_{trx} = \sum \frac{8b}{r'} = \frac{8B}{r'} = \frac{8B}{r} \cdot \left(\frac{1}{1-\rho} - \rho\right) \quad \text{(Eq. 6)}$$

where b is the number of bytes of a turn and B is the number of total bytes transmitted by the application.

Furthermore, the propagation delay can be determined as the product of the bit-level latency, say l, and the number of turns, say T, so that:

$$\Sigma D_{prp} = l \cdot T \quad \text{(Eq. 7)}$$

and $$t = \frac{8B}{r} \cdot \left(\frac{1}{1-\rho} - \rho\right) + l \cdot T + t_c + t_s \quad \text{(Eq. 8)}$$

where $t_c$ and $t_s$ are the total processing time of the client and server (for all turns), respectively.

Thus, in one embodiment, the present invention is able to use the above-derived latency determination to establish WAN network characteristics for use in predicting application performance.

Response Time for Threads in a Simple Application with TCP Flow Control

Flow control is used in networks to prevent or limit jamming, as is well known in the art. For protocols such as SPX and NCP, flow control operates substantially similarly in a WAN environment as in a LAN environment. For example, in a network using the SPX protocol, a node sends two frames at a time, while a node in an NCP network sends a maximum of 16 frames at a time in burst mode.

By contrast, TCP flow control can significantly change the behavior of a WAN-implemented application. In particular, TCP flow control operates by employing slow start and sliding window techniques to control traffic flow. These techniques can have substantial effects on application behavior and response time, as will be described below.

The "sliding window" technique throttles the traffic flow on the network by allowing the sender to limit the amount of data sent, up to the size of the window. This effectively decreases the bandwidth of the bottleneck of the WAN link. In order to model the resulting change in application behavior, one embodiment of the present invention determines the equivalent bandwidth resulting from the sliding window technique, and obtains the response time accordingly. The details for determining equivalent bandwidth will be described below.

Figure 4:
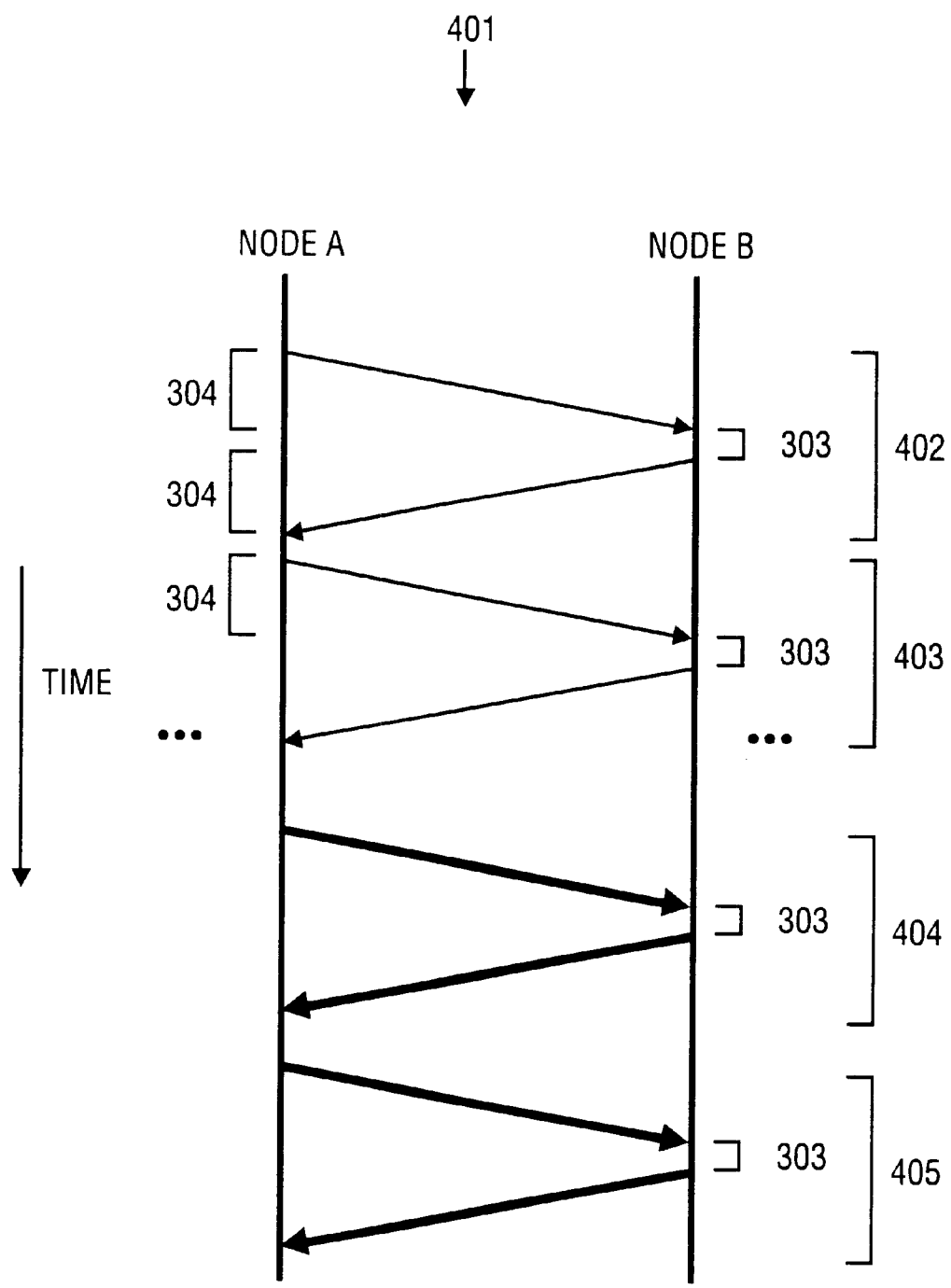
FIG. 4 is a diagram showing response prediction for a simple application with TCP flow control.

The slow start technique scales up the size of packets with each transmission. The first transmission is a single packet of size b; packet size is doubled each time an acknowledgment is returned, until the packet size limit (either the window size or the threshold) is reached. Referring now to FIG. 4, there is shown an example of an event trace 401 for a simple application with TCP flow control, involving communications between Node A and Node B. In turn 402 a packet is transmitted from Node A to Node B, and a response packet is transmitted back to Node A. Transmission time 304 is indicated as representing the delay between sending a packet and receiving it at the other node. In addition, processing time 303 represents the time at Node B between receipt of the initial packet and transmission of the response packet.

In turn 403, the packet size is doubled, as indicated by the increased thickness of the lines representing packet transmissions. Again transmission time 304 is shown, as is processing time 303 at Node B.

In turn 404, the packet size is doubled again. In turn 405, the packet size limit has been reached, so packet size remains the same.

The slow start technique adds more turns to the application; thus, one embodiment of the present invention takes into account the additional turns resulting from the user of slow start. The impact of slow start and TCP window size are determined as follows.

The threshold of the TCP window size to maintain bandwidth utilization is given by:

$$p = lr \tag{Eq. 9}$$

where:
l is the bit-level latency (or bit-level round-trip time); and
r is the bandwidth.

In one embodiment, bit-level latency or bit-level round-trip time l is determined based on the ping time to a node of similar topology, as follows:

$$l = t_p - d_p \tag{Eq. 9a}$$

where:
$t_p$ is the ping time; and
$d_p$ is the transmission delay of the ping, given by:

$$d_p = 2*8*((D+H)/r) \tag{Eq. 9b}$$

where:
D is the ping data size;
H is the ping header size; and
r is the bottleneck bandwidth along the path of the nodes.

If w denotes the window size of the TCP protocol, there are two cases:

Case 1. If w>p, the window size is not the limiting factor for the throughput. Thus, $$2^{n-1} \cdot b \leq p \tag{Eq. 10}$$

where:
n is the number of turns which fill up the pipeline; and
b is the Maximum Segment Size (MSS), as defined in TCP specifications.

Thus, by Eq. 9, $$n = \left\lfloor \log_2\left(\frac{p}{b}\right) \right\rfloor + 1 = \left\lfloor \log_2\left(\frac{l \cdot r}{b}\right) \right\rfloor + 1 \tag{Eq. 11}$$

and the total number of turns for the application is given by:

$$T = n + T_m - 1 = \left\lfloor \log_2\left(\frac{l \cdot r}{b}\right) \right\rfloor + T_m \tag{Eq. 12}$$

where $T_m$ is the measured number of turns of the application on the LAN.

The response time of the application is therefore given by:

$$t = \frac{8B}{r} + T \cdot l + t_c + t_s \tag{Eq. 13}$$

$$= \frac{8B}{r} + \left\lfloor \log_2\left(\frac{l \cdot r}{b}\right) \right\rfloor \cdot l + T_m \cdot l + t_c + t_s$$

where, as before:
B is the total traffic data of the application in bytes;
$t_c$ is the total processing time of the client; and
$t_s$ is the total processing time of the server.

Case 2. If w<p, the window size is the limiting factor for the throughput. The equivalent bandwidth is w/l, and the response time is given by:

$$t = \frac{8B}{r} + T \cdot l + t_c + t_s \tag{Eq. 14}$$

$$= \frac{8B \cdot l}{r} + \left\lfloor \log_2\left(\frac{w}{b}\right) \right\rfloor \cdot l + T_m \cdot l + t_c + t_s$$

where, as before:
B is the total traffic data of the application in bytes;
$t_c$ is the total processing time of the client; and
$t_s$ is the total processing time of the server.

Using the above techniques, the present invention is able to account for the effects of flow control when predicting response time for threads.

Response Time Prediction for an Application

In step 806, the invention predicts the overall response time of the application, based on the predicted response time for individual threads. In one embodiment, this step includes taking into account the relationships among threads of an application. The present invention is able to predict behavior for simple applications (i.e. having no parallel threads) and non-simple applications (i.e. applications having parallel threads).

When an application is migrated from a LAN environment to a WAN environment, thread relationships, such as parent-child relationships and finish-start relationships are generally preserved, though the relationships are sometimes modified due to the new environment. For example, when a client node initiates a new thread upon completion of a previous thread, the time between the end of the previous thread and the start of the new thread is determined by the processing time at the client node of the dependent thread. For simple applications, all threads are serial, so that the processing time can be assumed to be the same regardless of the network characteristics. However, non-simple applications have parallel threads and thus the node processing time (either at the client, server, or both) may overlap among various threads. Such overlap has a deleterious effect on processing time, as the node is forced to handle more than one task at a time. As the bottleneck bandwidth decreases, more overlap among parallel threads tends to occur, so that response time increases nonlinearly with each thread.

In addition to determining dependencies, one embodiment of the present invention predicts the increase of thread overlap that results from migration to a WAN environment, as described above, for a non-simple application. In one embodiment, the present invention predicts the increase by using a nonlinear curve which represents the effect of overlapping node processing time resulting from decreased bandwidth in the WAN environment. Transmission time is not overlapped, because all threads share the WAN bandwidth. One example of a nonlinear curve that may be used to predict overlap increase is:

$$O_I = (O_M) * \left(1 - \frac{b_W}{b_L}\right)^5 \quad \text{(Eq. 15)}$$

where:

$O_I$ (overlap increase) is the increased overlap time when the application is migrated from LAN to WAN;

$O_M$ (maximum overlap) is the total node processing time for nodes associated with the parallel threads;

$b_W$ is the bandwidth of the WAN; and $b_L$ is the bandwidth of the LAN.

In general other nonlinear curves may be used, and in one embodiment the nonlinear curve may be developed experimentally based on available data.

Thus, to predict the response time for a non-simple application, the present invention breaks the application down into threads, and predicts the response for each thread in step 805 as described above. Thread relationships are assumed to be preserved when the application is migrated, so that the overall response time for the application is determined in step 806 from the thread relationship, as follows:

$$t = \Sigma(t_{thread}) + \Sigma(t_{inter}) - (O_L + O_I) \quad \text{(Eq. 16)}$$

where:

$t_{thread}$ is the predicted thread time;

$t_{inter}$ is the inter-thread node processing time;

$O_L$ is the overlap time of the LAN; and $O_I$ (overlap increase) is the increased overlap time when the application is migrated from LAN to WAN.

From the above description, it will be apparent that the invention disclosed herein provides a novel and advantageous system and method of predicting the response time of a network-based software application. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer-implemented method of application response time prediction, comprising the steps of:

measuring performance characteristics of a network-based application implemented in a first network environment;

obtaining network characteristics of a second network environment;

and applying the obtained network characteristics of the second network environment to the measured performance characteristics of the application, to generate a predicted application response time.

2. The computer-implemented method of claim 1, wherein the first network environment is a local area network and the second network environment is a wide area network.

3. The computer-implemented method of claim 1, wherein the step of obtaining network characteristics comprises obtaining network characteristics comprising at least one selected from the group consisting of:

bottleneck bandwidth;

network configuration;

effect of network protocols;

round trip latency; and background load on bottleneck.

4. The computer-implemented method of claim 1, wherein the second network environment contains a bottleneck, and wherein the step of obtaining network characteristics comprises the substep of obtaining characteristics of the bottleneck of the second network;

and wherein the step of applying the obtained network characteristics comprises the substep of applying the obtained bottleneck characteristics to the measured performance characteristics of the application.

5. The computer-implemented method of claim 4, wherein the second network environment is a wide area network (WAN), and the bottleneck comprises a WAN link.

6. The computer-implemented method of claim 4, wherein the substep of obtaining characteristics of the bottleneck comprises the substep of obtaining a measurement of bandwidth of the bottleneck of the second network;

and wherein the substep of applying the obtained bottleneck characteristics comprises the substep of applying the obtained bandwidth measurement to the measured performance characteristics of the application.

7. The computer-implemented method of claim 6, wherein the sub-step of obtaining a measurement of bandwidth comprises determining an equivalent bandwidth using the equation:

$$r' = \frac{r}{N+1}$$

where:

r is the bandwidth of the WAN link; and

N is an average queue length.

8. The computer-implemented method of claim 7, wherein the sub-step of obtaining a measurement of bandwidth further comprises determining the average queue length using the equation:

$$N = \frac{\rho^2}{1-\rho}$$

where ρ is a utilization factor.

9. The computer-implemented method of claim 1, wherein the network-based application contains no parallel threads.

10. The computer-implemented method of claim 1, wherein the network-based application contains at least two parallel threads.

11. The computer-implemented method of claim 1, wherein:
   the step of measuring performance characteristics comprises measuring a processing time for the application;
   the step of obtaining network characteristics comprises obtaining a transmission delay for the second network environment; and
   the step of applying the obtained network characteristics comprises adding the transmission delay to the processing time.

12. The computer-implemented method of claim 11, wherein the application comprises a plurality of turns, and wherein the step of applying the obtained network characteristics comprises, for each turn, adding the transmission delay to the processing time.

13. The computer-implemented method of claim 1, wherein:
   the step of measuring performance characteristics comprises measuring a client processing time for the application and a server processing time for the application;
   the step of obtaining network characteristics comprises obtaining a transmission delay and a propagation delay for the second network environment; and
   the step of applying the obtained network characteristics comprises adding the transmission delay, the propagation delay, the client processing time, and, the server processing time.

14. The computer-implemented method of claim 1, wherein the second network environment employs TCP flow control.

15. The computer-implemented method of claim 14, wherein the second network environment employs a slow start flow control method, and wherein the step of applying the obtained network characteristics comprises:
   determining an additional number of turns resulting from the slow start flow control method; and
   applying the additional number of turns to the measured performance characteristics of the application.

16. The computer-implemented method of claim 14, wherein the second network environment employs a sliding window flow control method, and wherein the step of applying the obtained network characteristics comprises:
   determining an equivalent bandwidth resulting from the sliding window flow control method; and
   applying the determined equivalent bandwidth to the measured performance characteristics of the application.

17. The computer-implemented method of claim 1, wherein the application comprises a plurality of threads, and wherein the step of applying the obtained network characteristics comprises:
   deconstructing the application into the plurality of threads;
   for each thread, generating a predicted the response time; and
   generating a predicted application response time by combining the predicted thread response times.

18. The computer-implemented method of claim 17, wherein at least two threads have a relationship with each other, and wherein the step of generating a predicted application response time comprises:
   combining the predicted response times for the threads; and
   adjusting the combined response time responsive to predicted node processing time overlap in the second network environment.

19. The computer-implemented method of claim 18, wherein the step of adjusting the combined response time comprises applying a nonlinear equation to predict thread overlap in the second network environment.

20. The computer-implemented method of claim 18, wherein one of the threads has a parent-child relationship with respect to another of the threads.

21. The computer-implemented method of claim 18, wherein the start of one of the threads depends upon the completion of another of the threads.

22. The computer-implemented method of claim 1, wherein the network-based application contains at least two parallel threads, and wherein:
   the step of measuring performance characteristics comprises measuring an amount of thread overlap for the application in the first network environment; and
   the step of applying the obtained network characteristics comprises determining an estimated change in thread overlap for the application in the second network environment.

23. The computer-implemented method of claim 22, wherein the step of applying the obtained network characteristics comprises applying a non-linear equation to predict thread overlap in the second network environment.

24. A computer program product comprising a computer-usable medium having computer-readable code embodied therein for predicting application response time, comprising:
   computer-readable program code devices configured to cause a computer to measure performance characteristics of a network-based application implemented in a first network environment;
   computer-readable program code devices configured to cause a computer to obtain network characteristics of a second network environment; and
   computer-readable program code devices configured to cause a computer to apply the obtained network characteristics of the second network environment to the measured performance characteristics of the application, to generate a predicted application response time.

25. The computer program product of claim 24, wherein the first network environment is a local area network and the second network environment is a wide area network.

26. The computer program product of claim 24, wherein the computer-readable program code devices configured to cause a computer to obtain network characteristics comprise computer-readable program code devices configured to cause a computer to obtain network characteristics comprising at least one selected from the group consisting of:
   bottleneck bandwidth;
   network configuration;
   effect of network protocols;
   round trip latency; and
   background load on bottleneck.

27. The computer program product of claim 24, wherein the second network environment contains a bottleneck, and wherein the computer-readable program code devices configured to cause a computer to obtain network characteristics comprise computer-readable program code devices configured to cause a computer to obtain characteristics of the bottleneck of the second network;

and wherein the computer-readable program code devices configured to cause a computer to apply the obtained network characteristics comprises computer-readable program code devices configured to cause a computer to apply the obtained bottleneck characteristics to the measured performance characteristics of the application.

28. The computer program product of claim 27, wherein the second network environment is a wide area network (WAN), and the bottleneck comprises a WAN link.

29. The computer program product of claim 27,
wherein the computer-readable program code devices configured to cause a computer to obtain characteristics of the bottleneck comprises computer-readable program code devices configured to cause a computer to obtain a measurement of bandwidth of the bottleneck of the second network;

and wherein the computer-readable program code devices configured to cause a computer to apply the obtained bottleneck characteristics comprises computer-readable program code devices configured to cause a computer to apply the obtained bandwidth measurement to the measured performance characteristics of the application.

30. The computer program product of claim 29, wherein the computer-readable program code devices configured to cause a computer to obtain a measurement of bandwidth comprise computer-readable program code devices configured to cause a computer to determine an equivalent bandwidth using the equation:

$$r' = \frac{r}{N+1}$$

where:
r is the bandwidth of the WAN link; and
N is an average queue length.

31. The computer program product of claim 30, wherein the computer-readable program code devices configured to cause a computer to obtain a measurement of bandwidth further comprise computer-readable program code devices configured to cause a computer to determine the average queue length using the equation:

$$N = \frac{\rho^2}{1-\rho}$$

where ρ is a utilization factor.

32. The computer program product of claim 24, wherein the network-based application contains no parallel threads.

33. The computer program product of claim 24, wherein the network-based application contains at least two parallel threads.

34. The computer program product of claim 24, wherein:
the computer-readable program code devices configured to cause a computer to measure performance characteristics comprise computer-readable program code devices configured to cause a computer to measure a processing time for the application;
the computer-readable program code devices configured to cause a computer to obtain network characteristics comprise computer-readable program code devices configured to cause a computer to obtain a transmission delay for the second net-work environment; and
the computer-readable program code devices configured to cause a computer to apply the obtained network characteristics comprise computer-readable program code devices configured to cause a computer to add the transmission delay to the processing time.

35. The computer program product of claim 34, wherein the application comprises a plurality of turns, and wherein the computer-readable program code devices configured to cause a computer to apply the obtained network characteristics comprise computer-readable program code devices configured to cause a computer to, for each turn, add the transmission delay to the processing time.

36. The computer program product of claim 24, wherein:
the computer-readable program code devices configured to cause a computer to measure performance characteristics comprise computer-readable program code devices configured to cause a computer to measure a client processing time for the application and a server processing time for the application;
the computer-readable program code devices configured to cause a computer to obtain network characteristics comprise computer-readable program code devices configured to cause a computer to obtain a transmission delay and a propagation delay for the second network environment; and
the computer-readable program code devices configured to cause a computer to apply the obtained network characteristics comprise computer-readable program code devices configured to cause a computer to add the transmission delay, the propagation delay, the client processing time, and the server processing time.

37. The computer program product of claim 24, wherein the second network environment employs TCP flow control.

38. The computer program product of claim 37, wherein the second network environment employs a slow start flow control method, and wherein the computer-readable program code devices configured to cause a computer to apply the obtained network characteristics comprise:
computer-readable program code devices configured to cause a computer to determine an additional number of turns resulting from the slow start flow control method; and
computer-readable program code devices configured to cause a computer to apply the additional number of turns to the measured performance characteristics of the application.

39. The computer program product of claim 37, wherein the second network environment employs a sliding window flow control method, and wherein the computer-readable program code devices configured to cause a computer to apply the obtained network characteristics comprise:
computer-readable program code devices configured to cause a computer to determine an equivalent bandwidth resulting from the sliding window flow control method; and
computer-readable program code devices configured to cause a computer to apply the determined equivalent bandwidth to the measured performance characteristics of the application.

40. The computer program product of claim 24, wherein the application comprises a plurality of threads, and wherein the computer-readable program code devices configured to cause a computer to apply the obtained network characteristics comprise:

computer-readable program code devices configured to cause a computer to deconstruct the application into the plurality of threads;

computer-readable program code devices configured to cause a computer to, for each thread, generate a predicted the response time; and computer-readable program code devices configured to cause a computer to generate a predicted application response time by combining the predicted thread response times.

41. The computer program product of claim 40, wherein at least two threads have a relationship with each other, and wherein the computer-readable program code devices configured to cause a computer to generate a predicted application response time comprise:

computer-readable program code devices configured to cause a computer to combine the predicted response times for the threads; and computer-readable program code devices configured to cause a computer to adjust the combined response time responsive to predicted node processing time overlap in the second network environment.

42. The computer program product of claim 41, wherein the computer-readable program code devices configured to cause a computer to adjust the combined response time comprise computer-readable program code devices configured to cause a computer to apply a nonlinear equation to predict thread overlap in the second network environment.

43. The computer program product of claim 41, wherein one of the threads has a parent-child relationship with respect to another of the threads.

44. The computer program product of claim 41, wherein the start of one of the threads depends upon the completion of another of the threads.

45. The computer program product of claim 24, wherein the network-based application contains at least two parallel threads, and wherein:

the computer-readable program code devices configured to cause a computer to measure performance characteristics comprise computer-readable program code devices configured to cause a computer to measure an amount of thread overlap for the application in the first network environment; and the computer-readable program code devices configured to cause a computer to apply the obtained network characteristics comprise computer-readable program code devices configured to cause a computer to determine an estimated change in thread overlap for the application in the second network environment.

46. The computer program product of claim 45, wherein the computer-readable program code devices configured to cause a computer to apply the obtained network characteristics comprise computer-readable program code devices configured to cause a computer to apply a nonlinear equation to predict thread overlap in the second network environment.

47. A system for application response time prediction, comprising:

a monitoring module, for measuring performance characteristics of a network-based application implemented in a first network environment;

a tools module for obtaining network characteristics of a second network environment; and a response time predictor, coupled to the monitoring module and to the tools module, for applying the obtained network characteristics of the second network environment to the measured performance characteristics of the application, to generate a predicted application response time.

48. The system of claim 47, wherein the second network environment contains a bottleneck, and wherein the tools module obtains characteristics of the bottleneck of the second network;

and wherein the response time predictor applies the obtained bottleneck characteristics to the measured performance characteristics of the application.

49. The system of claim 47, wherein the network-based application contains at least two parallel threads.

50. The system of claim 47, wherein:

the monitoring module comprises a processing time monitor, for measuring a client processing time for the application and a server processing time for the application;

the tools module comprises a delay monitor, for obtaining a transmission delay and a propagation delay for the second network environment; and the response time predictor comprises a delay adder, for adding the transmission delay, the propagation delay, the client processing time, and the server processing time.

51. The system of claim 47, wherein:

the second network environment employs a slow start flow control method; and the response time predictor comprises a turn estimator, for determining an additional number of turns resulting from the slow start flow control method;

and wherein the response time predictor applies the additional number of turns to the measured performance characteristics of the application.

52. The system of claim 47, wherein:

the second network environment employs a sliding window flow control method; and the response time predictor comprises a an equivalent bandwidth estimator, for determining an equivalent bandwidth resulting from the sliding window flow control method;

and wherein the response time predictor applies the determined equivalent bandwidth to the measured performance characteristics of the application.

53. The system of claim 47, wherein the application comprises a plurality of threads, and wherein the response time predictor comprises:

an application deconstructor, for deconstructing the application into the plurality of threads;

a thread response time predictor, coupled to the application deconstructor, for generating a predicted the response time for each thread; and an application response time predictor, coupled to the thread response time predictor, for generating a predicted application response time by combining the predicted thread response times.

54. The system of claim 53, wherein at least two threads have a relationship with each other, and wherein the application response time predictor comprises:

a response time combiner, for combining the predicted response times for the threads; and a response time adjuster, coupled to the response time combiner, for adjusting the combined response time responsive to predicted node processing time overlap in the second network environment.

* * * * *

UNITED STATES PATENT AND TRADEMARK OFFICE
CERTIFICATE OF CORRECTION

PATENT NO.     : 6,393,480 B1
DATED          : May 21, 2002
INVENTOR(S)    : Qin et al.

It is certified that error appears in the above-identified patent and that said Letters Patent is hereby corrected as shown below:

Column 9,
Line 53, delete "Ir" and insert -- lr --.

Column 12,
Line 6, delete "comprising the steps of" and insert -- the method including --
Line 22, delete "step of".
Lines 22, 34 and 45, after "obtaining" insert -- of the --.
Line 22, delete "comprises" and insert -- includes --.
Line 34, delete "step of".
Lines 35, 38, 46 and 50, delete "comprises the substep of" and insert -- includes --.
Line 37, delete "step of".
Line 37, after "applying" insert -- of --.
Line 43, delete "comprises" and insert -- includes --.
Line 45, delete "substep of"
Line 49, delete "substep of".
Line 49, after "applying" insert -- of --.
Line 54, delete "substep of".
Line 54, delete "a" and insert -- of the --.
Line 55, delete "comprises" and insert -- includes --.
Line 65, delete "substep of".
Line 65, delete "a" and insert -- of the --.
Line 66, delete "comprises" and insert -- includes --.

Column 13,
Line 15, delete "step of".
Line 15, after "measuring" insert -- of the --.
Line 15, delete "comprises" and insert -- includes --.
Line 17, delete "step of".
Line 17, after "obtaining" insert -- of the --.
Line 20, delete "step of"
Line 20, after "applying" insert -- of --.
Line 21, delete "comprises" and insert -- includes --.
Line 24, delete "comprises" and insert -- includes --.
Line 25, delete "step of"
Line 25, after "applying" insert -- of --.

UNITED STATES PATENT AND TRADEMARK OFFICE
CERTIFICATE OF CORRECTION

PATENT NO. : 6,393,480 B1
DATED : May 21, 2002
INVENTOR(S) : Qin et al.

It is certified that error appears in the above-identified patent and that said Letters Patent is hereby corrected as shown below:

<u>Column 13, cont'd.,</u>
Line 26, delete "comprises" and insert -- includes --.
Line 30, delete "step of".
Line 30, after "measuring" insert -- of the --.
Line 33, delete "step of".
Line 33, after "obtaining" insert -- of the --.
Line 33, delete "comprises" and insert -- includes --.
Line 36, delete "step of".
Line 36, after "applying" insert -- of --.
Line 37, delete "comprises" and insert -- includes --.
Line 45, delete "step of".
Line 45, after "applying" insert -- of --.
Line 46, delete "comprises" and insert -- includes --.
Line 53, delete "step of".
Line 54, after "applying" insert -- of--.
Line 61, delete "comprises" and insert -- includes --.
Line 62, delete "step of".
Line 63, delete "comprises" and insert -- includes --.

<u>Column 14,</u>
Line 5, delete "step of".
Line 5, delete "a" and insert -- of the --.
Line 13, delete "step of".
Line 13, after "adjusting" insert -- of --.
Line 14, delete "comprises" and insert -- includes --.
Line 25, delete "step of".
Line 25, after "measuring" insert -- of the --.
Line 25, delete "comprises" and insert -- includes --.
Line 28, delete "step of".
Line 28, after "applying" insert -- of --.
Line 29, delete "comprises" and insert -- includes--.
Line 33, delete "step of".
Line 33, after "applying" insert -- of --.
Line 34, delete "comprises" and insert -- includes --.
Line 38, delete "comprising" and insert -- the product including --.
Line 57, delete "comprise" and insert – include --.
Line 60, delete "consisting of" and insert -- including --.

UNITED STATES PATENT AND TRADEMARK OFFICE
CERTIFICATE OF CORRECTION

PATENT NO. : 6,393,480 B1
DATED : May 21, 2002
INVENTOR(S) : Qin et al.

It is certified that error appears in the above-identified patent and that said Letters Patent is hereby corrected as shown below:

Column 15,
Line 3, delete "comprise" and insert -- include --.
Line 8, delete "comprises" and insert -- includes --.
Line 15, delete "comprises" and insert -- includes --.
Line 19, delete "comprises" and insert -- includes --.
Line 25, delete "comprises" and insert -- includes --.
Line 33, delete "comprise" and insert -- include --.
Line 47, delete "comprise" and insert -- include --.
Line 63, delete "comprise" and insert -- include --.

Column 16,
Line 1, delete "comprise" and insert -- include --.
Line 5, delete "comprise" and insert -- include --.
Line 10, delete "comprises" and insert -- includes --.
Line 13, delete "comprise" and insert -- include --.
Line 25, delete "comprise" and insert -- include --.
Line 31, delete "comprise" and insert -- include --.
Line 41, delete "comprise" and insert -- include --.
Line 54, delete "comprise" and insert -- include --.
Line 64, delete "comprises" and insert -- includes --.
Line 67, delete "comprise" and insert -- includes --.

Column 17,
Line 15, delete "comprise" and insert -- include --.
Line 26, delete "comprise" and insert -- include --.
Line 40, delete "comprise" and insert -- include --.
Line 46, delete "comprise" and insert -- include --.
Line 46, delete "comprise" and insert -- include --.
Line 53, delete "comprise" and insert -- include --.
Line 58, delete "comprising" and insert -- the system including --.
Line 59, delete ", for measuring" and insert -- to measure --.
Line 62, delete "for obtaining" and insert -- to obtain --.
Line 65, delete "for applying" and insert -- to apply --.

UNITED STATES PATENT AND TRADEMARK OFFICE
CERTIFICATE OF CORRECTION

PATENT NO. : 6,393,480 B1
DATED : May 21, 2002
INVENTOR(S) : Qin et al.

It is certified that error appears in the above-identified patent and that said Letters Patent is hereby corrected as shown below:

<u>Column 18,</u>
Line 13, delete "comprises" and insert -- includes --.
Line 14, delete ", for measuring" and insert -- to measure --
Line 17, delete "comprises" and insert -- includes --.
Line 17, delete ", for obtaining" and insert -- to obtain --.
Line 20, delete "comprises" and insert -- includes --.
Line 20, delete ", for adding" and insert -- to add --.
Line 28, delete "comprises" and insert -- includes --.
Line 28, delete ", for determining" and insert -- to determine --.
Line 37, delete "comprises a" and insert -- includes --.
Line 38, delete ", for determining" and insert -- to determine --.
Line 45, delete "comprises" and insert -- includes --.
Line 46, delete "comprises" and insert -- includes --
Line 47, delete ", for deconstructing" and insert -- to deconstruct --
Line 51, delete ", for generating" and insert -- to generate --.
Line 54, delete ", for generating" and insert -- to generate --.
Line 59, delete "comprises" and insert -- includes --.
Line 60, delete ", for combining" and insert -- to combine --.
Line 63, delete ", for adjusting" and insert -- to adjust --.

Signed and Sealed this

Sixth Day of May, 2003

JAMES E. ROGAN
*Director of the United States Patent and Trademark Office*